Feb. 26, 1957  R. F. ANDERSON  2,782,735
ICE CREAM TART NOZZLE
Filed July 11, 1955
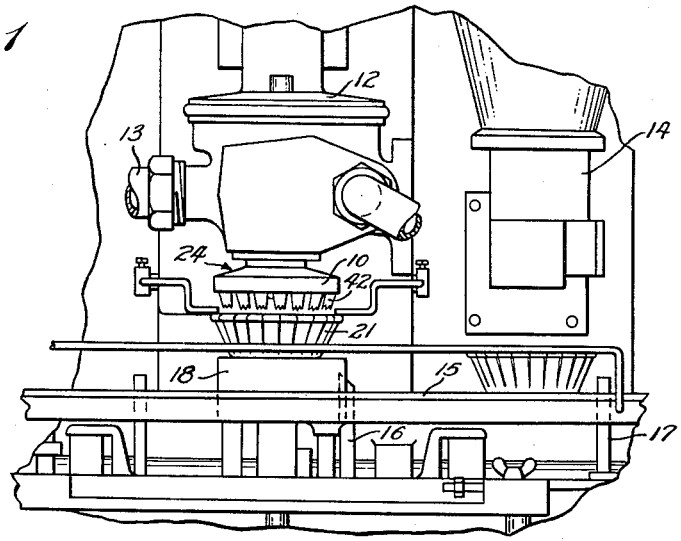
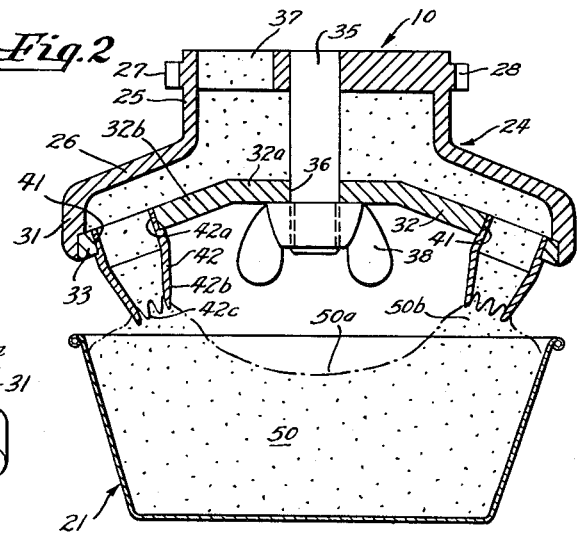
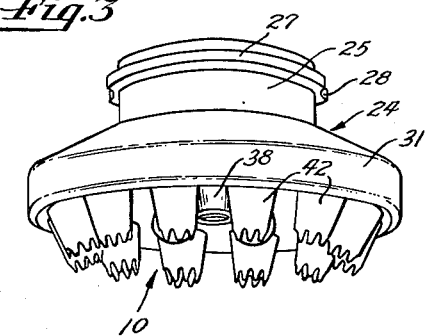
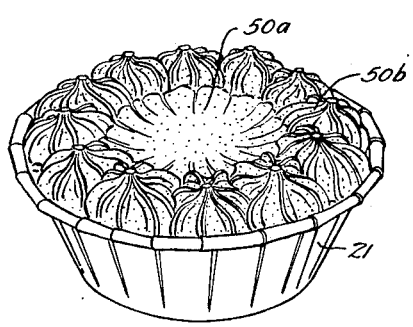
Inventor
Ralph F. Anderson
By McCanna and Morsbach
Attys.

United States Patent Office 2,782,735
Patented Feb. 26, 1957

2,782,735

ICE CREAM TART NOZZLE

Ralph F. Anderson, Rockford, Ill.

Application July 11, 1955, Serial No. 521,232

6 Claims. (Cl. 107—14)

This invention relates to a filler nozzle assembly and particularly to a nozzle for filling cups with plastic comestibles such as ice cream to form tarts and the like.

An important object of this invention is to provide a novel arrangement for discharging plastic comestible material into a cup to form a central confection receiving depression in the filled cup.

Another object of this invention is to provide an ice cream nozzle of simple configuration, which may be readily assembled and disassembled thereby facilitating cleaning of the nozzle.

These, together with various ancillary objects and advantages of this invention will be more readily appreciated as the same becomes better understood by reference to the following detailed description when taken in connection with the accompanying drawings wherein:

Figure 1 is a fragmentary front elevational view of a filling machine having the nozzle of the present invention mounted thereon;

Fig. 2 is a vertical sectional view through the nozzle and cup illustrating the latter in a filled condition;

Fig. 3 is a perspective view of the filler nozzle; and

Fig. 4 is a perspective view of a cup filled by the nozzle.

The tart forming nozzle, indicated generally by the numeral 10 is adapted for use on a filling machine of the general type disclosed in my copending application Serial No. 378,609 entitled "Container Filling Machine" and wherein a measured quantity of comestible is dispensed into each cup as the latter are successfully positioned below the filler nozzle. In general, the filling machine includes a dispensing mechanism 12 having an inlet 13, which dispensing mechanism measures a quantity of comestible flowing from the inlet and dispenses the measured quantity through the nozzle 10. A syruping attachment 14 is preferably mounted at one side of the dispensing mechanism 12 and arranged for operation in timed relation with the dispensing mechanism to discharge a quantity of confection such as syrup into the cup positioned therebelow. A conveyer 15 is provided for moving the cups successively past the dispensing mechanism 12 and the syruping attachment 14, a plurality of cam operated stops 16 and 17 being provided to stop the containers below the dispensing mechanism and the syruping attachment. An elevating platform 18 is disposed below the dispensing mechanism and operated to elevate the container or cup 21 into its filling position just below the filler nozzle 10. The plastic comestible, such as ice cream, is then dispensed through the filler nozzle, under pressure from the dispensing mechanism 12, to fill the cup.

In accordance with the present invention, the filler nozzle is arranged to control the distribution of ice cream in the cup in such a manner as to form a central confection or syrup receiving depression in the upper surface of the filled cup whereby, when the cup is thereafter advanced by the conveyer 15 to the syruping attachment, the depression may be wholly or partially filled with a confection such as syrup to form a tart. The nozzle 10 comprises a bell-shaped body 24 having an upwardly extending neck portion 25 at the upper end thereof and an outwardly flared lower end portion 26. The nozzle may be adapted for attachment in any suitable manner to the dispensing mechanism 12 and as shown there is provided a bayonet type arrangement including an annular collar 27 on the upwardly extending neck of the nozzle, which collar has diametrically opposed recesses formed therein and adapted to cooperate with complementary formed keepers (not shown) on the dispensing mechanism. In this manner, the nozzle may be readily attached to and detached from the dispensing mechanism. Clearly, if desired, any other suitable arrangement for detachably coupling the nozzle to the dispensing mechanism may be provided. A depending skirt portion 31 is formed on the lower end of the outwardly flared lower portion 26 and a bottom plate 32 is mounted on the body to operate the lower open end thereof. Conveniently, the skirt portion 31 may be formed with an annular recess 33 adapted to receive the periphery of the bottom plate 32.

In order to facilitate easy removal of the bottom plate, for cleaning of the nozzle, an attaching bolt 35 is attached to the body and arranged to extend axially thereof through a central aperture 36 in the bottom plate. As shown, a cross member 37 is cast integrally with the upwardly extending neck portion of the nozzle body and extends across the inlet opening at the upper end thereof. The bolt 35 is rigidly secured to this cross member, in any desired manner. A wing nut 38 or the like is threaded onto the bolt 35 to draw the bottom plate 32 snugly against the lower edge of the nozzle body, as is clearly shown in Fig. 2.

The bottom plate 32 is formed with a plurality of annularly spaced discharge openings 41 located adjacent the periphery of the plate. In accordance with the present invention, a plurality of individual nozzle elements 42 are mounted on the bottom plate in communication with each of the discharge openings, which nozzle elements are spaced relatively closer to each other than the radial spacing of the nozzle elements from the center of the nozzle body whereby the ice cream or other plastic comestible dispensed through the nozzle elements fills the outer portion of the cup 21. In order to provide a controlled filling of the central portion of the container or cup, to form a shallow depression in the upper surface of the filled cup for the reception of confection, and in such a manner as to prevent the formation of voids in the filled cup below the surface of the ice cream, the nozzle elements are each slanted inwardly to direct the ice cream towards the center of the cup.

Conveniently, the bottom plate 32 is formed in the shape of an inverted dish having a preferably flat central portion 32a and an outwardly and downwardly inclined peripheral portion 32b. The nozzle elements 42 each preferably comprise an annular body having a reduced upper end 42a which is press fitted or otherwise rigidly secured to the bottom plate around the openings 41 therein, which nozzle elements have a frusto-conical lower end portion 42b defining a reduced diameter opening at the lower end thereof. The nozzle elements are each mounted to extend perpendicular to the downwardly inclined peripheral portion 32b of the plate and thus extend downwardly and inwardly from the plate to direct the ice cream downwardly and inwardly into a cup 21 positioned below the nozzle. If desired, the lower edges of the nozzles may be serrated or otherwise configured, as shown at 42c to provide a decorative effect on the ice cream dispensed therefrom.

As is best shown in Fig. 2 the ice cream designated 50 which is dispensed under pressure from the dispensing mechanism through the nozzle body and out through the nozzle elements 42 is directed by the inwardly inclined nozzle elements, downwardly and inwardly into the cup 21. The ice cream thus flows towards the central portion of the cup to fill the same. The nozzle elements, as previously described, are spaced radially from the center of the nozzle body a distance greater than the spacing between the nozzle elements so that the nozzle elements tend to fill only the outer portion of the cup. By inclining the nozzle elements inwardly, a portion of the ice cream is directed towards the center of the cup to partially fill the latter, the slant of the nozzle elements being correlated with the radial spacing of the nozzle elements from the center of the nozzle body so that the central portion of the cup is filled to a lesser extent than the outer portion, thereby forming a shallow central confection receiving depression 50a in the filled cup. In this manner, controlled filling of the central portion of the cup is effected without providing a separate nozzle element or element for filling the center of the cup, and in such a manner as to prevent the formation of voids in the body of ice cream or other plastic comestible in the cup.

As previously described, the dispensing apparatus discharges the measured quantity of comestible from the dispensing apparatus under pressure. At the completion of the dispensing portion of the filling cycle, the pressure on the comestible is released. The tapered nozzle elements 42 are designed to maintain the comestible in the nozzle and prevent flow through the nozzle elements when the pressure on the comestible is released. Thus, as the cup is lowered away from the nozzle elements upon completion of the dispensing of the comestible into the cup, the plastic comestible at the tips of the nozzle elements is drawn off thereby forming the individual rosettes 50b on the upper surface of the filled cup and providing a decorative tart. The filled cup is then passed by the conveyor 15 to the syruping attachment where a confection is dispensed into the shallow depression in the filled cup.

Since the annularly spaced inwardly directed nozzle elements are arranged to also fill the central portion of the cup to the desired level, it is apparent that centrally located nozzle elements, such as have heretofore been used in tart forming nozzles to provide controlled filling of the central portion of the cup, have been eliminated. This enables the efficacious arrangement disclosed for detachably mounting the bottom plate on the nozzle body. As is apparent, the single centrally located bolt and nut for attaching the bottom plate on the nozzle body provides a simple construction which may be rapidly assembled and disassembled and which has relatively few parts so that the nozzle may be easily cleaned.

I claim:

1. A filler nozzle for filling cups with ice cream and the like to form tarts comprising a downwardly opening bell-shaped body having an inlet at the upper end thereof, a bottom wall attached to said body and extending across the lower end thereof, said bottom wall having a plurality of discharge openings arranged concentrically of the bottom wall in the outer extremities thereof, said openings being equally spaced from one another and providing the sole outlets for the ice cream from the nozzle, a plurality of individual nozzle elements of like number to said discharge openings attached to the bottom each in communication with one of said discharge openings, said discharge openings having their centers spaced apart a distance less than the spacing of the centers of the nozzle elements from the center of the bottom wall, said nozzle elements extending downwardly from the bottom wall and slanted inwardly toward the axis of said body at an angle of less than 45° to the axis of the bottom wall to direct the ice cream flowing therefrom inwardly toward the center of the cup to fill the central portion of the cup with the ice cream flowing from said nozzles.

2. A tart forming filler nozzle for filling cups with ice cream and the like comprising a downwardly opening bell-shaped body having an inlet opening in the upper end thereof, an inverted dish-shaped bottom wall attached to said body and extending across the lower open end thereof, said bottom wall having a downwardly and outwardly inclined peripheral portion and a plurality of discharge openings arranged concentrically of the bottom wall in the outer extremities of said inclined peripheral portion, said discharge openings being equally spaced from one another and forming the sole outlets from said nozzle, a plurality of individual nozzle elements of like number to said discharge openings mounted on said bottom wall each in communication with one of said openings, said discharge openings having their centers spaced apart a distance less than the spacing of the centers of the nozzle elements from the center of the bottom wall, said nozzle elements extending perpendicular to the inclined portion of said bottom wall at the point of attachment therewith and slanting inwardly and downwardly of the nozzle body to direct a portion of the ice cream toward the center of the cup to fill the central portion of the cup.

3. A tart forming nozzle for filling cups with ice cream and the like comprising a downwardly opening bell-shaped body having an inlet opening at the upper end thereof, a bottom plate adapted to extend across the lower open end of said body, a bolt attached to said body to extend axially thereof and through said bottom plate, fastener means on the end of said bolt which extends through said plate drawing the latter snugly against the lower end of the body, said plate having a plurality of outlet openings arranged concentrically of said plate in the outer extremities thereof, said openings being equally spaced from one another and forming the sole outlets from said nozzle, and a plurality of individual nozzle elements of like number to said discharge openings mounted on said bottom wall each in communication with one of said openings, said outlet openings having their centers spaced apart a distance less than the spacing of the centers of the nozzle elements from the center of the bottom wall, said nozzle elements extending downwardly from said bottom wall and inwardly toward the axis of said body at an angle of less than 45° to the axis of said plate to direct a portion of the ice cream toward the center of a cup positioned therebelow.

4. A tart forming nozzle for filling cups with ice cream and the like comprising a downwardly opening bell-shaped body having an inlet opening at the upper end thereof and an outwardly flared lower end portion, an attachment bolt secured to said body and extending axially thereof, an inverted dish-shaped bottom wall having a central opening for receiving said bolt and a downwardly and outwardly inclined peripheral portion, a fastener on said bolt for drawing the bottom plate axially of said body to seal the periphery of the plate to said body, said plate having a plurality of discharge openings arranged concentrically of the bottom wall in the outer extremities of said inclined portion, said openings being equally spaced from another and providing the sole outlets from said nozzle, a plurality of individual nozzle elements of like number to said discharge openings attached to said bottom wall each in communication with one of said openings, said nozzle elements extending perpendicular to the inclined portion of said plate at the point of attachment thereto and slanting downwardly and inwardly from said plate, said discharge openings having their centers spaced apart a distance less than the radical spacing of the centers of said elements from the center of the body, the slant of said nozzle elements inwardly of the body being correlated with the radial spacing of said elements from the center of said body to direct the ice cream toward the center of the cup and fill the latter to a lesser extent than the adjacent outer periphery of the cup.

5. A tart forming nozzle for filling cups with ice cream and the like comprising a downwardly opening bell-shaped body having an inlet opening at the upper end thereof and an outwardly flared lower end portion, an attachment bolt secured to said body and extending axially thereof, an inverted dish-shaped bottom wall having a central opening for receiving said bolt and a downwardly and outwardly inclined peripheral portion, a fastener on said bolt for drawing the bottom plate axially of said body to seal the periphery of the plate to said body, said plate having a plurality of discharge openings arranged concentrically of said bottom wall in the outer extremities of said inclined peripheral portion, said openings being equally spaced from one another and providing the sole outlets from said nozzle, and a plurality of annular downwardly tapering individual nozzle elements of like number to said discharge openings each extending into one of said openings in said bottom wall, said discharge openings having their centers spaced apart a distance less than the spacing of the centers of the nozzle elements from the center of the bottom wall, said nozzle elements extending perpendicular to said plate at the point of attachment thereto and slanting downwardly and inwardly at an angle of less than 45° to the axis of said plate to a point below the level of said fastener to direct the ice cream downwardly into a cup positioned below the nozzle and toward the center of the cup.

6. A nozzle for filling cups with ice cream and the like to form tarts comprising a circular hollow body having a bottom wall, a passage extending into said body for conveying ice cream thereto, said bottom wall having a plurality of discharge openings arranged concentrically of the bottom wall in the outer extremities thereof, said openings being equally spaced from one another and providing the sole outlets for ice cream from the nozzle, a plurality of annular downwardly tapering individual nozzle elements of like number to said discharge openings attached to said bottom wall each in communication with one of said discharge openings, said nozzle elements extending downwardly and inwardly at an angle of less than 45° to the axis of said bottom wall to direct a portion of the ice cream flowing therefrom toward the axis of the bottom wall, the lower ends of each of said nozzle elements having their centers spaced from the centers of the lower ends of the adjacent nozzle elements a distance less than the radial spacing of the center of the lower end of each nozzle element from the axis of said bottom wall.

References Cited in the file of this patent

UNITED STATES PATENTS

| | | |
|---|---|---|
| 1,709,280 | Ost | Apr. 16, 1929 |
| 1,808,788 | Proos | June 9, 1931 |
| 2,486,194 | Moser | Oct. 25, 1949 |
| 2,651,270 | Moser | Sept. 8, 1953 |
| 2,657,649 | Daanen et al. | Nov. 3, 1953 |

FOREIGN PATENTS

| | | |
|---|---|---|
| 54,201 | Denmark | Jan. 24, 1938 |
| 240,058 | Germany | Oct. 28, 1911 |